United States Patent [19]

Watanabe

[11] Patent Number: 4,487,265

[45] Date of Patent: Dec. 11, 1984

[54] ACIDIZING A SUBTERRANEAN RESERVOIR

[75] Inventor: David J. Watanabe, Orange, Calif.

[73] Assignee: Union Oil Company of California, Los Angeles, Calif.

[21] Appl. No.: 333,439

[22] Filed: Dec. 22, 1981

[51] Int. Cl.$^3$ .............................................. E21B 43/27
[52] U.S. Cl. ................................. 166/307; 252/8.55 C
[58] Field of Search .................... 252/8.55 B, 8.55 C; 166/307, 304

[56] References Cited

U.S. PATENT DOCUMENTS

| | | |
|---|---|---|
| 2,238,671 | 4/1941 | Woodhouse . |
| 2,824,833 | 2/1958 | Cardwell et al. . |
| 3,179,171 | 4/1965 | Beale, Jr. . |
| 3,254,718 | 7/1966 | Dunlap . |
| 3,402,770 | 9/1968 | Messenger . |
| 3,481,404 | 12/1969 | Gidley . |
| 3,548,945 | 12/1970 | Gidley . |
| 3,791,446 | 2/1974 | Tate ................................ 252/8.55 X |
| 3,819,520 | 6/1974 | Jones et al. . |
| 3,826,312 | 7/1974 | Richardson et al. . |
| 3,892,275 | 7/1975 | Lybarger et al. . |
| 3,902,557 | 9/1975 | Shaughnessy et al. . |
| 3,920,566 | 11/1975 | Richardson et al. ............... 252/8.55 |

Primary Examiner—Herbert B. Guynn
Attorney, Agent, or Firm—Dean Sanford; Gregory F. Wirzbicki; Gerald L. Floyd

[57] ABSTRACT

The permeability of subterranean hydrocarbon-producing reservoirs is increased by introducing therein a mixture containing a tertiary carboxylic acid alkylated amide and a glycol ether in combination with an aqueous solution of an acid and, optionally, including a water-soluble polymer, preferably a nitrogen-containing polymer.

29 Claims, No Drawings

ACIDIZING A SUBTERRANEAN RESERVOIR

BACKGROUND OF THE INVENTION

1. Field of the Invention

This invention relates to a composition and method for treating a subterranean reservoir penetrated by a well to increase the permeability of the reservoir surrounding the well. More particularly, the invention relates to a composition and method which are especially suitable for treating a hydrocarbon-producing reservoir containing silicates and/or carbonates by removing from such reservoir carbonaceous deposits, siliceous deposits and portions of the reservoir rock.

2. Description of the Prior Art

It is often desired to increase the permeability of a subterranean reservoir penetrated by a well so that a fluid can flow more easily into and out of the reservoir via the well. Many reservoirs originally have a low permeability due to the nature and configuration of the reservoir rock. Other reservoirs become plugged or partially plugged with various deposits due to the flow of fluids therethrough. The plugging material can be either organic in nature, such as carbonaceous materials deposited from liquid or gaseous petroleum, or inorganic in nature, such as alkaline earth metal carbonates deposited from an aqueous liquid or finely divided particulate solid reservoir materials such as silicates and/or carbonates which shift position, swell or otherwise changes in character when contacted by a fluid flowing through the reservoir. Previously, various compositions have been proposed for treating subterranean reservoirs to increase their permeability. Such compositions have included numerous organic solvents for organic deposits as well as various acidizing solutions for inorganic deposits and components of the reservoir rock. Acidizing is an especially widely practiced process for increasing or restoring the permeability of subterranean reservoirs to facilitate the flow therethrough of formation fluids, including oil, gas or a geothermal fluid, and injected fluids, including enhanced recovery drive fluids. Acidizing involves injecting into the reservoir an acid, typically hydrochloric acid, in order to dissolve portions of the reservoir rock or plugging or partially plugging deposits therein, thereby opening and enlarging pore throats and other flow channels and increasing the effective porosity or permeability of the reservoir.

One problem in acidizing even moderately higher temperature reservoirs encountered in petroleum-producing wells is that the acid is rapidly consumed by the reactive material immediately adjacent the borehole before the acid can penetrate any significant distance into the reservoir. Without adequate reservoir penetration, the acidizing operation can be of little value in treating the drainage area around a well. The higher the temperature of the reservoir the more pronounced this effect becomes. In view of this and other problems, the prior art acidizing methods are limited, as a practical matter, to the acidizing of reservoirs having temperatures on the order of about 200° F. and less.

A still further problem in acidizing reservoirs is in directing a greater proportion of the acidizing solution into the hydrocarbon-containing portions of the reservoir and a correspondingly lesser proportion into the watercontaining portions, improving the relative permeability of the reservoir to oil, and reducing the subsequent formation of stable emulsions of water, oil and formation fines loosened during the treatment.

Various references describe acidizing or other compositions for injection into reservoirs, which compositions contain one or more of the components of the acidizing composition of this invention.

U.S. Pat. Nos. 3,481,404 and 3,548,945 to Gidley involve a method for increasing the permeability of siliceous formations by injecting therein an aqueous solution of an acid such as hydrofluoric acid. The acid solution can contain or be followed by a low molecular weight aliphatic glycol ether such as ethylene glycol monobutyl ether.

Compositions containing various amides or amide derivatives have previously been suggested for introduction into reservoirs as part of an acidizing or other treatment. U.S. Pat. No. 3,892,275 to Lybarger et al. describes a thickened aqueous well treating fluid for gravel packing, fracturing, fluid diverting, selective plugging and fluid displacement. The compositiion is an aqueous liquid containing a cellulose ether thickener, an acidifying material, and a slow reactive pH increasing material. The acidizing material may be hydrochloric acid present in sufficient quantity to decrease the solution viscosity of the system after a selected time-temperature exposure. The slow reactive pH increasing material may be a lower organic acid amide, for example formamide, dimethylformamide or acetamide, which increases the pH of the solution to neutral after an additional length of time.

U.S. Pat. No. 3,826,312 to Richardson covers a self-neutralizing well acidizing composition containing hydrochloric acid and a slow reactive pH increasing material such as an organic acid amide, for example formamide or acetamide, which increases the pH of the solution to neutral after an additional length of time.

U.S. Pat. No. 2,238,671 to Woodhouse describes a method for increasing the fluid flow from oil wells by injecting therein as an acidizing solution an aqueous solution of a readily hydrolyzable amide such as formamide, acetamide, hydroxy acetamide, methoxy acetamide, diglycol urea and isobutoxy acetamide.

U.S. Pat. No. 2,824,833 to Cardwell et al. shows a hydrochloric acid acidizing solution containing a water-soluble gum thickener, such as karaya, tragacanth and the like.

U.S. Pat. No. 3,179,171 to Beale Jr. describes a hydrochloric acid acidizing solution containing a polymer such as polyvinylpyrrolidone.

In spite of the success of some of these aforementioned treatments, the need exists for a further improved well treating composition and method for use thereof to increase the permeability of a subterranean reservoir, especially a reservoir containing siliceous and/or carbonate material.

Accordingly, it is a principal object of this invention to provide a composition and method for increasing the permeability of a subterranean reservoir by removing therefrom plugging and partially plugging deposits and/or a portion of the reservoir itself.

A further object of the invention is to provide such a composition and method for use in a higher temperature reservoir containing siliceous material and/or carbonate material, in most instances without including a conventional corrosion inhibitor.

An additional object of the invention is to provide such a composition which includes an acidizing component.

A still further object of the invention is to provide such a composition and method wherein the rate of reaction of the acidizing composition on materials in the reservoir is retarded.

Another object of the invention is to provide such a composition and method wherein the depth of penetration of the acidizing composition into the reservoir is increased.

Still another object of the invention is to provide such a composition and method wherein the acidizing composition remains in a single phase when exposed to carbonate-containing reservoirs.

Yet another object of the invention is to provide such a composition and method wherein the permeability of the reservoir to oil is improved.

Other objects, advantages and features will become apparent from the following description.

SUMMARY OF THE INVENTION

Briefly, the invention provides a composition and method for increasing the permeability of a subterranean reservoir, especially moderately higher temperature reservoirs having temperatures of up to about 400° F. wherein there is introduced into the reservoir, via a well penetrating the reservoir, a retarded acidizing composition comprising a solution of (a) about 5 to 75 parts by volume of a mixture of about 25 to 75 percent by volume of a tertiary carboxylic acid alkylated amide characterized by the formula:

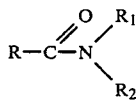

wherein (1) R is hydrogen or an alkyl group containing 1 to about 8 carbon atoms, and (2) $R_1$ and $R_2$ are the same or different alkyl groups containing 1 to about 8 carbon atoms, which amide is a proton-carrying first mutual solvent, and about 75 to 25 percent by volume of a second mutual solvent comprising a glycol ether having at least one alkyl group containing 2 to 10 carbon atoms, said glycol ether containing about 3 to 22 carbon atoms per molecule, and (b) about 95 to 25 parts by volume of an aqueous solution of a selected from the group consisting of low molecular weight organic acids, hydrochloric acid, hydrofluoric acid, mixtures of hydrochloric acid and water-soluble ammonium fluoride or bifluoride salts and admixtures thereof. Optionally, especially for use in higher temperature reservoirs, the composition can include about 0.002 to 0.02 parts by weight of a water-soluble polymer selected from the group consisting of polyacrylamide, partially hydrolyzed polyacrylamide, vinylpyrrolidone, polyalkene oxide, heteropolysaccharide produced by bacteria of the genus Xanthomonas, cellulose ether and natural gum. Nitrogen-containing polymers are preferred.

DETAILED DESCRIPTION OF THE INVENTION

The composition and method of this invention are suitable for acidizing subterranean reservoirs, especially moderately higher temperature reservoirs, such as those having a temperature of up to about 400° F., and especially about 100° F. to 400° F. By proper selection of the acidizing solution described more fully hereinafter, the composition and method of this invention are suitable for acidizing reservoirs containing carbonate materials, such as limestone and dolomite, siliceous materials, such as sandstone, serpentine and clay, other acid-soluble reservoir constituents, and various deposits from formation fluids or previously injected fluids such as carbonate scale, sulfate scale, resins, waxes, asphaltene polymers and other oily polymers. The acidizing composition of this invention is made up in part by a proton-carrying first mutual solvent, tertiary carboxylic acid alkylated amide which can react with a proton as shown by the following reaction:

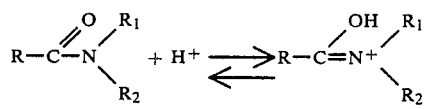

wherein (1) R is hydrogen or an alkyl group containing 1 to about 8 carbon atoms, and (2) $R_1$ and $R_2$ are the same or different alkyl groups containing 1 to about 8 carbon atoms. Preferred tertiary carboxylic acid alkylated amides are N,N-dimethylformamide, N,N-diethylformamide, N,N-dimethylacetamide, N,N-diethylacetamide, N,N-dipropylacetamide, N,N-dimethylpropionamide, N,N-diethylpropionamide. Other alkylated amides which may be used include N-methyl,N-ethylacetamide, N-methyl,N-octylpropionamide, N-methyl,N-hexyl n-butyramide, N-methyl, N-propylcaproamide, N,N-diethylcaprylamide and the like. N,N-dimethylformamide is especially preferred. The alkylated amides may be prepared by any one of several methods which are well known in the art, such as the reaction of an acyl chloride, acyl anhydride or carboxylic acid with a secondary amine. The tertiary carboxylic acid alkylated amide reacts with acids to form a cationic complex ion by capturing a proton from the acid. This complexing effect reduces the corrosion that otherwise would occur when an acid solution alone contacts the metal equipment of a well when the composition is injected into a reservoir via the well. However, when injected into a reservoir, especially a reservoir having a temperature of about 100° to 400° F., the complex ion releases the proton or acid gradually and completely without reducing the total available proton or acid for acidizing the reservoir. This proton or acid is then available for reacting with acid-soluble deposits present in the pores of the reservoir or acid-soluble components of the reservoir itself. Thus, the complex ion can be injected a substantial distance into the reservoir before all of the proton or acid reforms, reacts and spends. Therefore, the amide is capable of preventing corrosion in a well and improving the permeability of a reservoir up to a substantial distance away from a well rather than affecting only the immediate vicinity of the well as is characteristic of many previously used acidizing compositions. The composition of the invention includes, in addition to the tertiary carboxylic acid alkylated amide, an aqueous solution of hydrochloric acid; hydrofluoric acid; a mixture of hydrochloric acid and hydrofluoric acid or a fluoride salt; formic, acetic, propionic, citric, sulfonic and similar low molecular weight organic acids having from 1 to about 6 carbon atoms; modified organic acids such as chloroacetic acid; and mixtures of the aforementioned acids and salts.

This same tertiary carboxylic acid alkylated amide also serves as a first mutual solvent. The amide especially improves the solubility between water and a second mutual solvent, a glycol ether.

The glycol ethers utilized for the purposes of this invention as a second mutual solvent are the $C_2$ to $C_{10}$ alkyl ethers containing about 3 to 22 carbon atoms per molecule which are at least partially soluble in both oil and water under reservoir conditions. Examples of such ethers include: ethylene glycol monomethyl ether, ethylene glycol dimethyl ether, ethylene glycol monoethyl ether, ethylene glycol diethyl ether, ethylene glycol monopropyl ether, ethylene glycol monobutyl ether, ethylene glycol monophenyl ether, diethylene glycol dimethyl ether, diethylene glycol monoethyl ether, diethylene glycol diethyl ether, diethylene glycol n-butyl ether, triethylene glycol dimethyl ether, triethylene glycol butyl ether, triethylene glycol hexyl ether, triethylene glycol decyl ether, tetraethylene glycol dimethyl ether, tetraethylene glycol butyl ether, tetraethylene glycol hexyl ether, tetraethylene glycol decyl ether, propylene glycol methyl ether, dipropylene glycol monomethyl ether, dipropylene glycol dimethyl ether and tripropylene glycol monomethyl ether. The preferred glycol ether is ethylene glycol monobutyl ether. The acid component of this invention is an acid selected from the group consisting of low molecular weight organic acids, hydrochloric acid, hydrofluoric acid, mixtures of hydrochloric acid and water-soluble ammonium fluoride or bifluoride salts and admixtures thereof.

Suitable low molecular weight organic acids include formic, acetic, citric and tartaric acids. Halogenated organic acids such as mono-, di- and trichloro-acetic acids can also be used.

Aqueous solutions of hydrochloric acid employed will ordinarily contain about 5 to 28 percent by weight hydrogen chloride. Aqueous solutions of hydrofluoric acid or fluoride salt employed will contain about 1 to 30 percent by weight fluoride ion. The organic acids or modified organic acids will generally be used in concentrations ranging from about 10 to 100 percent by weight.

Mixtures of hydrochloric acid with hydrofluoric acid are often referred to as mud acids because of their ability to dissolve drilling mud particles. These acids normally have a hydrogen chloride content between about 5 and 15 percent by weight and a hydrogen fluoride content between about 2 and 6 percent by weight. They may be prepared by adding crystalline ammonium fluoride or bifluoride to hydrochloric acid. The hydrogen chloride reacts with the fluoride salt to form hydrogen fluoride and hence the more salt added the greater will be the hydrogen fluoride concentration and the lower will be the hydrogen chloride concentration. Other preparation methods, including the mixing of hydrochloric acid with hydrofluoric acid, can also be employed.

Regardless of the strength of the aqueous solutions of the various acids or salts employed, a sufficient quantity of acid is used in admixture with the proton-carrying component or amide to provide a mixture containing about 5 to 75 parts by volume of an aqueous solution of a proton-carrying component and about 95 to 25 parts by volume of an aqueous solution of an acid. Preferably, the mixture contains about 45 to 70 parts by volume of an aqueous solution of a proton-carrying component and about 55 to 30 parts by volume of an aqueous solution of an acid.

At higher reservoir temperatures, even greater depth of penetration of the acidizing composition into the reservoir and further control of corrosion can be achieved by including in the composition about 0.0025 to 0.025 parts by weight, preferably about 0.005 to 0.02 parts by weight, of a water-soluble polymer. Suitable polymers include polyacrylamide, partially hydrolyzed polyacrylamide, vinylpyrrolidone, polyalkene oxide, heteropolysaccharide produced by bacteria of the genus Xanthomonas, cellulose ether and natural gum. The molecular weight of the above-described water-soluble polymers can vary over a wide range, e.g., 10,000 to 25,000,000. The preferred polymers have a molecular weight in excess of 1,000,000.

The polymers are believed to function by reducing the mass transfer rate in the solution to slow down the acid reaction. Especially preferred polymers are those which contain nitrogen in the polymer chain, e.g., polyacrylamide, partially hydrolyzed polyacrylamide and vinylpyrrolidone, which also are capable of forming a chain of cationic complex ions with acids and affect the corrosion rate and depth of penetration of live acid into the reservoir in the same manner described above in the discussion of tertiary carboxylic acid alkylated amides.

Polymers useful in the invention are commercially available. Pusher 700 polymer marketed by The Dow Chemical Company of Midland, Mich. is an example of a suitable polyacrylamide. The partially hydrolyzed polyacrylamides have up to 70 percent of the carboxamide groups originally present in the polyacrylamide hydrolyzed to carboxyl groups. Pusher 757 marketed by the Dow Chemical Company is an example of a suitable partially hydrolyzed polyacrylamide.

Vinylpyrrolidone polymers which can be employed are those having the recurring unit of the formula:

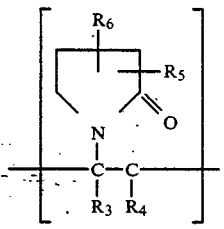

wherein $R_3$, $R_4$, $R_5$ and $R_6$ are independently selected from the group consisting of hydrogen and alkyl radicals having 1 to 5 carbon atoms. Useful alkyl radicals include methyl, ethyl, propyl, butyl, pentyl and isomeric forms thereof. Where each of the above-described R groups are hydrogen, the resulting compound is polyvinylpyrrolidone, i.e., poly-N-vinyl-2-pyrrolidone, a preferred polymer. Polyvinylpyrrolidone 360 marketed by Aldrich Chemical Company of Milwaukee, Wis. is a suitable polymer.

Polyalkeneoxide is prepared by homopolymerization of a single alkene oxide, for example ethylene oxide, propylene oxide or butylene oxide. It is preferred to employ the homopolymer of polyethylene oxide such as Polyox marketed by Union Carbide Chemicals Company of New York, N.Y.

The heteropolysaccharides which may be used in carrying out the present invention are ionic polysaccharides produced by fermentation of carbohydrates such as starch by bacteria of the genus Xanthomanas. Kelzan MF marketed by Kelco Company of San Diego, Calif. is a suitable heteropolysaccharide.

Cellulose ethers which may be employed include carboxyalkylcellulose such as carboxymethylcellulose and carboxyethylcellulose, hydroxyethylcellulose and carboxymethylhydroxyethylcellulose. Natrosol 250, a hydroxyethylcellulose marketed by Hercules Incorporated of Wilmington, Del. may be used.

Natural gums which may be used include starch; plant exudates such as arabic, tragacanth, karaya and ghatti; seeds or roots such as locust bean, guar, psyllium seed and quince seed; and seaweed extracts such as agar, algin, carrageenan and furcellaran.

The ingredients of the composition can be combined in any desired order. When a polymer is included, it is preferred to add the polymer to the aqueous acidizing solution before adding the amide.

The acidizing composition of this invention containing a tertiary carboxylic acid alkylated amide, glycol ether, an acid and optionally a water-soluble polymer also has the property of being less corrosive to metal conduits and other metal equipment in a well with which it comes in contact than a similar acidizing composition without the amide component. Thus, in some instances adequate control of corrosion can be achieved without a conventional corrosion inhibitor. In other instances it may be desirable to add a conventional corrosion inhibitor to the acidizing composition. Suitable inhibitors include inorganic compounds such as sodium chromate as well as acetylenic alcohols, heterocyclic nitrogen compounds, substituted thioureas, rosin amine derivatives, quaternary ammonium compounds, and similar organic agents. Other additives may also be present. These include surface active agents designed to function as demulsifiers, wetting agents, anti-sludge agents, complexing agents intended to prevent the formation of gelatinous iron hydroxides, drag reducing agents, fluid loss control agents, diverting agents and the like. A wide variety of additives designed to perform these and related functions are available commercially and will be familiar to those skilled in the art. The additives selected should, of course, be compatible with the particular acidizing solution employed.

When the acidizing composition of this invention includes hydrofluoric acid or an ammonium fluoride salt it is preferred to inject into the reservoir, prior to the injection of the acidizing composition, a preflush of about 50 to 150 gallons per vertical foot of interval to be treated comprising a slug of an aqueous composition, or an oil, which also contains a tertiary carboxylic acid alkylated amide and glycol ether but contains no hydrofluoric acid or ammonium fluoride salt. Injected fluoride ions can combine with divalent ions present in the reservoir to form insoluble precipitates which can plug a portion of the reservoir. This precipitation decreases the effectiveness of the acidizing treatment. A preflush separates the fluoride ion-containing compositions from such divalent ions. Thus, the possibility of precipitation of fluoride salts is decreased.

Similarly it is sometimes preferred to inject into the reservoir, following the injection of the acidizing composition, an afterflush of about the same volume as the preflush. The afterflush can be either an aqueous or oil solution containing about 5 to 35 percent by volume of a tertiary carboxylic acid alkylated amide and about 5 to 35 percent by volume of a glycol ether. An oil afterflush will maximize the relative permeability to oil of the portion of the reservoir contacted by the afterflush. If an oil afterflush is used, it is preferred to use an oil that is clean, free of particulate matter and will not react with the acid to form a sludge. An oil afterflush should not be used in treating water injection wells because of the adverse effect of such an afterflush on the relative permeability of the reservoir.

Following an acidizing treatment, the treated well or wells are generally placed back in service either as production wells or injection wells. The fluids subsequently injected into or produced through the portion of the reservoir contacted by the acidizing composition displace the spent acidizing composition. With conventional aqueous acidizing fluids, this displacement is incomplete, i.e., a portion of the treating solution tends to remain in the treated zone and can cause water-logging or water-blocking of at least some of the pores of the reservoir. When the acidizing composition of this invention is used in this manner, the tertiary carboxylic acid alkylated amide and glycol ether components tend to behave as mutual solvents and improve the ability of subsequently injected or produced fluids to displace the spent acidizing solution. Thus, the amount of water-logging or water-blocking is reduced and the permeability of the reservoir to fluids is increased.

The invention is further illustrated by the following examples which are illustrative of various aspects of the invention and are not intended as limiting the scope of the invention as defined by the appended claims.

EXAMPLE 1

An acidizing composition of the prior art is prepared by admixing 50 parts by volume of ethylene glycol monobutyl ether and 50 parts by volume of an aqueous solution of 15 percent by weight hydrochloric acid. A uniform clear solution is formed. 70 milliliters of this acidizing composition is placed in a 250 milliliter cylinder. A rectangular segment of calcium carbonate $2\frac{1}{2}$ inches long and $\frac{1}{4}$ inch $\times \frac{1}{4}$ inch in cross section is positioned at a 45° angle in the cylinder so that one end of the segment rests on the bottom of the cylinder and the other end extends to near the top of the acidizing composition. The cylinder is immersed in a constant temperature bath at 200° F. for 20 hours. At the end of this time, it is observed that the acidizing composition has separated into two layers, an upper organic layer of approximately 45 milliliters and a bottom aqueous layer of approximately 25 milliliters. The bottom portion of the calcium carbonate segment which is exposed to the bottom aqueous layer is visibly etched by the acid. The upper portion of the calcium carbonate specimen which is exposed to the upper organic layer is essentially unchanged in appearance and dimensions. Thus, the upper organic layer which separates when the acidizing composition contacts calcium carbonate does not contain sufficient acidizing components to dissolve calcium carbonate. A similarly sized sample of the acidizing solution aged in a cylinder at 200° F. for 20 hours but containing no calcium carbonate specimen remains uniform and no separation is observed. Thus, this prior art acidizing composition would not uniformly acidize a calcium carbonate reservoir. More particularly, acidizing of an oil-containing zone would be minimized.

EXAMPLE 2

The same procedure as described above is repeated using an acidizing composition of the instant invention prepared by admixing 25 parts by volume of ethylene glycol monobutyl ether, 25 parts by volume N,N-dimethylformamide and 50 parts by volume of an aqueous solution of 15 percent by weight hydrochloric acid. A uniform clear solution is formed. After aging the acidizing composition in contact with a segment of calcium carbonate, the acidizing solution is still uniform, no separation having taken place. The calcium carbonate segment is uniformly etched indicating uniform distribution of the acid component throughout the acidizing composition. Thus, the acidizing composition of this invention is capable of uniformly acidizing a calcium carbonate reservoir. Acidizing of an oil-containing zone is promoted.

EXAMPLE 3

A well having a 16 foot thick producing interval is completed at a depth of 16,750 feet in a reservoir containing both carbonate and siliceous materials and having a bottom hole temperature of 305° F. The well produces 110 barrels per day oil and 75 barrels per day water. It is desired to acidize the reservoir. First, there is injected into the reservoir via the well 800 gallons of a preflush composition comprising 75 parts by volume of an aqueous solution of 7.5 percent by weight hydrochloric acid, 25 parts by volume of N,N-dimethylformamide, 25 parts by volume of ethylene glycol monobutyl ether and 0.002 parts by weight of Pusher 1000* polyacrylamide. The preflush composition acidizes the carbonate portion of the reservoir and decreases the danger of precipitation of fluoride salts to be injected later. Next there is injected 6,500 gallons of a retarded acidizing composition comprising 50 parts by volume of an aqueous solution containing 12 percent by weight hydrochloric acid and 3 percent by weight hydrogen fluoride, 25 parts by volume of N,N-dimethylformamide, 25 parts by volume of ethylene glycol monobutyl ether and 0.002 parts by weight of Pusher 1000 polyacrylamide.
*Marketed by The Dow Chemical Company.

Finally, there is injected 800 gallons of an afterflush composition comprising 75 parts by volume of a crude oil, 25 parts by volume of N,N-dimethylformamide and 25 parts by volume of ethylene glycol monobutyl ether. After the well is returned to production there is a substantial increase in oil production but only a slight increase in water production. This indicates that most of the acidizing composition entered the oil-producing zone of the reservoir rather than the water-producing zone.

While various specific embodiments and modifications of this invention have been described in the foregoing specification, further modifications will be apparent to those skilled in the art. Such further modifications are included within the scope of this invention as defined by the following claims:

Having now described my invention, I claim:

1. A retarded acidizing composition for treating a subterranean hydrocarbon-producing reservoir penetrated by a well having a bottom hole temperature of up to about 400° F. comprising a solution of:
   (a) about 5 to 75 parts by volume of a mixture of (1) about 25 to 75 percent by volume of a proton-carrying first mutual solvent comprising a tertiary carboxylic acid alkylated amide characterized by the formula:

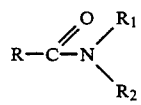

wherein (1) R is a hydrogen or alkyl group containing 1 to about 8 carbon atoms, and (2) $R_1$ and $R_2$ are the same or different alkyl groups containing 1 to about 8 carbon atoms and (2) about 75 to 25 percent by volume of a second mutual solvent comprising a glycol ether having at least one alkyl group containing 2 to 10 carbon atoms, said glycol ether containing about 3 to 22 carbon atoms per molecule, and
   (b) about 95 to 25 parts by volume of an aqueous solution of an acid selected from the group consisting of low molecular weight organic acids, hydrochloric acid, and admixtures thereof.

2. The composition defined in claim 1 wherein the tertiary carboxylic acid alkylated amide is selected from the group consisting of N,N-dimethylformamide, N,N-diethylformamide, N,N-dimethylacetamide, N,N-diethylacetamide, N,N-dipropylacetamide, N,N-dimethylpropionamide, and N,N-diethylpropionamide.

3. The composition defined in claim 1 wherein the glycol ether is ethylene glycol monobutyl ether.

4. The composition defined in claim 1 wherein the acid comprises an aqueous solution of about 1 to 30 percent by weight hydrochloric acid.

5. The composition defined in claim 1 wherein the composition comprises about 45 to 70 parts by volume of the mixture of mutual solvents and about 55 to 30 parts by volume of the aqueous solution.

6. The composition defined in claim 1 wherein the mixture also contains about 0.0025 to 0.025 parts by weight water-soluble polymer having a molecular weight of 10,000 to 25,000,000 selected from the group consisting of polyacrylamide, partially hydrolyzed polyacrylamide, vinylpyrrolidone polymers, polyalkene oxide, heteropolysaccharide produced by bacteria of genus Xanthomonas, cellulose ether and natural gum.

7. The composition defined in claim 6 wherein the water-soluble polymer is a nitrogen-containing polymer selected from the group consisting of polyacrylamide, partially hydrolyzed polyacrylamide and vinylpyrrolidone polymers.

8. An acidizing composition for increasing the permeability of a carbonate-containing subterranean reservoir having a temperature of about 400° F. and penetrated by a well comprising a solution of (a) about 5 to 75 parts by volume of a mixture of about 25 to 75 percent by volume of a proton-carrying first mutual solvent comprising a tertiary carboxylic acid alkylated amide selected from the group consisting of N,N-dimethylformamide and N,N-diethylformamide and about 75 to 25 percent by volume of a second mutual solvent comprising a glycol ether having at least one alkyl group containing 2 to 10 carbon atoms, said glycol ether containing about 3 to 22 carbon atoms per molecule, and (b) about 95 to 25 parts by volume of an aqueous solution of hydrochloric acid.

9. The composition defined in claim 8 wherein the glycol ether is ethylene glycol monobutyl ether.

10. The composition defined in claim 8 wherein the acid comprises an aqueous solution of 1 to about 30 percent by weight hydrochloric acid.

11. The composition defined in claim 8 wherein the composition comprises about 45 to 70 parts by volume of the mixture of mutual solvents and about 55 to 30 parts by volume of an aqueous acid solution.

12. The composition defined in claim 8 wherein the mixture also contains about 0.0025 to 0.025 parts by weight water-soluble polymer having a molecular weight of 10,000 to 25,000,000 selected from the group consisting of polyacrylamide, partially hydrolyzed polyacrylamide, vinylpyrrolidone polymers, polyalkylene oxide heteropolysaccharide produced by bacteria of genus Xanthomonas, cellulose ether and natural gum.

13. The composition defined in claim 12 wherein the water-soluble polymer is a nitrogen-containing polymer selected from the group consisting of polyacrylamide, partially hydrolyzed polyacrylamide and vinylpyrrolidone polymers.

14. A method for acidizing a subterranean hydrocarbon-producing or geothermal fluid-producing containing reservoir penetrated by a well having a bottom hole temperature of up to about 400° F. comprising injecting into said reservoir a solution of:
(a) about 5 to 75 parts by volume of a mixture of (1) about 25 to 75 percent by volume of a proton-carrying first mutual solvent comprising a tertiary carboxylic acid alkylated amide characterized by the formula:

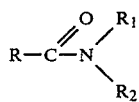

wherein R is a hydrogen or alkyl group containing 1 to about 8 carbon atoms, and $R_1$ and $R_2$ are the same or different alkyl groups containing 1 to about 8 carbon atoms and (2) about 75 to 25 percent by volume of a second mutual solvent comprising a glycol ether having at least one alkyl group containing 2 to 10 carbon atoms, said glycol ether containing about 3 to 22 carbon atoms per molecule, and
(b) about 95 to 25 parts by volume of an aqueous solution of an acid selected from the group consisting of low molecular weight organic acids, hydrochloric acid and admixtures thereof.

15. The method defined in claim 14 wherein the tertiary carboxylic acid alkylated amide is selected from the group consisting of N,N-dimethylformamide, N,N-diethylformamide, N,N-dimethylacetamide, N,N-diethylacetamide, N,N-dipropylacetamide, N,N-dimethylpropionamide, and N,N-diethylpropionamide.

16. The method defined in claim 15 wherein the glycol ether is ethylene glycol monobutyl ether.

17. The method defined in claim 14 wherein the acid comprises an aqueous solution of about 1 to 30 percent by weight hydrochloric acid.

18. The method defined in claim 14 wherein the composition comprises about 45 to 70 parts by weight of the mixture of mutual solvents and about 55 to 30 parts by weight of the aqueous acid solution.

19. The method defined in claim 14 wherein the reservoir is a gas-producing reservoir.

20. The method defined in claim 14 wherein the mixture also contains about 0.0025 to 0.025 parts by weight water-soluble polymer having a molecular weight of 10,000 to 25,000,000 selected from the group consisting of polyacrylamide, partially hydrolyzed polyacrylamide, vinylpyrrolidone polymers, polyalkeneoxide, heteropolysaccharide produced by bacteria of genus Xanthomonas, cellulose ether and natural gum.

21. The method defined in claim 20 wherein the water-soluble polymer is a nitrogen-containing polymer selected from the group consisting of polyacrylamide, partially hydrolyzed polyacrylamide and vinylpyrrolidone polymers.

22. A method for acidizing a subterranean hydrocarbon-producing carbonate-containing reservoir with a retarded acidizing composition, which reservoir has a temperature of up to about 400° F. and is penetrated by a well comprising injecting therein a solution of (a) about 5 to 75 parts by volume of a mixture of about 25 to 75 percent by volume of a proton-carrying first mutual solvent comprising a tertiary carboxylic acid alkylated amide selected from the group consisting of N,N-dimethylformamide and N,N-diethylformamide and about 75 to 25 percent by volume of a second mutual solvent comprising a glycol ether having at least one alkyl group containing 2 to 10 carbon atoms, said glycol ether containing about 3 to 22 carbon atoms per molecule, and (b) about 95 to about 5 parts by volume of an aqueous solution of hydrochloric acid.

23. The method defined in claim 22 wherein the glycol ether is ethylene glycol monobutyl ether.

24. The method defined in claim 22 wherein the acid comprises an aqueous solution of 1 to about 30 percent by weight hydrochloric acid.

25. The method defined in claim 22 wherein the composition comprises about 45 to 70 parts by volume of the mixture of mutual solvents and about 55 to 30 parts by volume of the aqueous acid solution.

26. The method defined in claim 22 wherein the reservoir is a gas-producing reservoir.

27. The method defined in claim 22 wherein the mixture also contains about 0.0025 to 0.025 parts by weight of a water-soluble polymer having a molecular weight of 10,000 to 25,000,000 selected from the group consisting of polyacrylamide, partially hydrolyzed polyacrylamide, vinylpyrrolidone polymers, polyalkene oxide, heteropolysaccharide produced by bacteria of genus Xanthomonas, cellulose ether and natural gum.

28. A method for acidizing a subterranean hydrocarbon-producing carbonate-containing reservoir with a retarded acidizing composition, which reservoir has a temperature of up to about 400° F. and is penetrated by a well, comprising injecting therein a solution of (a) about 5 to 75 parts by volume of a mixture of about 25 to 75 percent by volume of a proton-carrying first mutual solvent comprising a tertiary carboxylic acid alkylated amide selected from the group consisting of N,N-dimethylformamide and N,N-diethylformamide and about 75 to 25 percent by volume of a second mutual solvent comprising a glycol ether having at least one alkyl group containing 2 to 10 carbon atoms, said glycol ether containing about 3 to 22 carbon atoms per molecule, and (b) about 95 to 5 parts by volume of an aqueous solution of an acid selected from the group consisting of hydrofluoric acid and a mixture of hydrochloric acid and either hydrofluoric acid or a water-soluble ammonium fluoride or bifluoride salt, and the injection of the retarded acidizing composition is either preceeded or followed by a slug of about 50 to 150 gallons per vertical foot of reservoir to be treated of an aqueous or oil solution containing about 5 to 35 percent by volume of a tertiary carboxylic acid alkylated amide selected from the group consisting of N,N-dimethylformamide and N,N-diethylformamide and about 5 to 35 percent by volume ethylene glycol monobutyl ether.

29. A method for acidizing a subterranean hydrocarbon-producing or geothermal fluid-producing reservoir penetrated by a well having a bottom hole temperature of up to about 400° F. comprising:
(1) injecting into said reservoir a solution of:

(a) about 5 to 75 parts by volume of a mixture of (i) about 25 to 75 percent by volume of a proton-carrying first mutual solvent comprising a tertiary carboxylic acid alkylated amide characterized by the formula:

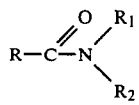

wherein R is a hydrogen or alkyl group containing 1 to about 8 carbon atoms, and $R_1$ and $R_2$ are the same or different alkyl groups containing 1 to about 8 carbon atoms; and (ii) about 75 to 25 percent by volume of a second mutual solvent comprising a glycol ether having at least one alkyl group containing 2 to 10 carbon atoms, said glycol ether containing about 3 to 22 carbon atoms per molecule; and (b) about 95 to 25 parts by volume of an aqueous solution of an acid selected from the group consisting of low molecular weight organic acids, hydrochloric acid, hydrofluoric acid, mixtures of hydrochloric acid and water-soluble ammonium fluoride or bifluoride salts and admixtures thereof; and (2) subsequently injecting, as an afterflush, an aqueous or oil solution containing about 5 to 35 percent by volume of a tertiary carboxylic acid alkylated amide, as defined in step (1) (a) (i), and about 5 to 35 percent by volume of a glycol ether, as defined in step (1) (a) (ii).

* * * * *